Oct. 29, 1968 J. D. BISHOP 3,408,553

DRIVEN INVERTER-REGULATOR WITH MAGNETIC AMPLIFIER IN FEEDBACK LOOP

Filed April 11, 1966

2 Sheets-Sheet 1

INVENTOR
BY J. D. BISHOP
John P. McDonnell
ATTORNEY

Oct. 29, 1968 J. D. BISHOP 3,408,553

DRIVEN INVERTER-REGULATOR WITH MAGNETIC AMPLIFIER IN FEEDBACK LOOP

Filed April 11, 1966

2 Sheets-Sheet 2

United States Patent Office 3,408,553

Patented Oct. 29, 1968

3,408,553

DRIVEN INVERTER-REGULATOR WITH MAGNETIC AMPLIFIER IN FEEDBACK LOOP

John D. Bishop, Basking Ridge, N.J., assignor to Bell Telephone Laboratories, Incorporated, New York, N.Y., a corporation of New York Filed Apr. 11, 1966, Ser. No. 541,578
10 Claims. (Cl. 321—16)

ABSTRACT OF THE DISCLOSURE

A regulated power supply comprising a magnetic amplifier in a feedback loop which is connected and biased so as to be responsive to changes in the input voltage to, and the output voltage of, a driven power inverter. A semiconductor switch is coupled with the source of driving signals to remove the driving signals to the power inverter whenever the core of the magnetic amplifier saturates.

This invention relates to power supply systems and, more particularly, to regulated power conversion systems.

In many power supply systems, converter circuits are used to convert an input DC voltage at one level to an output DC voltage at a different level. It is frequently required that the output DC level remain substantially constant and independent of any input level variations. In order to regulate the output against such input variations, many converter circuits employ closed loop feedback circuits which monitor the output and supply a compensating adjusting signal to the converter switches. However, inherent in such a regulation scheme is a limitation which arises by virtue of the fact that the compensation introduced by the adjusting signal is sensitive to, and dependent on, the parameters of the feedback circuitry.

One way of eliminating this dependence on the compensatory signal parameters of the feedback circuit is to connect the circuit providing the compensating signals so that it monitors the input source directly. Magnetic amplifiers are particularly suitable for this task since the ability to integrate a monitored source and provide an appropriate compensatory signal is inherent in such a device.

Another circuit technique employed in regulated converter circuits is the use of a driven, rather than a free-running, converter circuit to increase the stability and ability to regulate without elaborate circuit provisions. Specifically, an important advantage of using a driven converter circuit is the ability to vary the duty cycle of the AC output waveform.

An arrangement employing a magnetic amplifier which directly monitors the input voltage supplying a driven power converter circuit to adjust against variations thereof is disclosed in my copending joint application filed May 7, 1964 and having Ser. No. 365,726. As therein disclosed, the regulation of the AC output voltage against changes in input DC potential (which changes are manifested in corresponding changes in output voltage pulse height) is achieved through circuitry which automatically adjusts the width of the output voltage pulses so that the area under each pulse remains constant. The novel circuit of the noted copending applicaton also overcomes the speed of correction limitation inherent in most of the prior art magnetic amplifier monitoring circuits which generally require more than one cycle of input voltage change to elapse before corrective signals are produced.

While the regulated power system disclosed in this noted copending application is fully operative and satisfactory for the purposes to which it has been applied, the present invention is, as discussed hereinafter, an improvement thereof designed for applications which require a higher efficiency with a lower unit cost. While the prior novel arrangement departs from the prior art in providing instantaneous cycle-by-cycle compensation, it requires that the full power converted pass through the magnetic circuit employed. Since the cost and weight of magnetic core material required is proportional to the power handled by the magnetic device, and since the cost per pound is very high for core material having the saturable characteristics needed for magnetic amplifiers employed in applications such as that described, it is extremely desirable to provide a regulated converter which is able to handle greatly increased power levels. In addition to reducing the cost and bulk otherwise required in high-power regulated converters, it is also desired in the interest of versatility to be able to selectively vary the magnitude of a DC output voltage and current over a wide range.

Accordingly, it is an object of this invention to provide an improved regulated converter circuit.

It is another object of this invention to provide a regulated converter circuit which provides fast-acting cycle-by-cycle compensation against changes in the input voltage magnitude without a dependence on gain and response of error-detecting circuitry.

It is still another object of this invention to reduce the weight and cost of high-power fast-acting regulated converters.

In accordance with the objects of the invention, a DC input voltage, after an intermediate transformation to an AC voltage, is changed, by a driven power converter, to a DC output voltage of a different magnitude. The output magnitude is regulated against changes of input magnitude by providing in a feedback path divorced from the power conversion path a magnetic amplifier responsive to changes occurring during each and every cycle of the intermediate AC waveform to provide an immediate cycle-by-cycle correcting signal. The correcting signals produced adjust the proportional relationship of pulse duration to the half period of the intermediate AC voltage waveform in order to insure that the area of each voltage pulse remains constant despite variations in input voltage magnitude. This duty cycle adjustment is automatically accomplished through the use of the magnetic amplifier circuit designed to absorb a predetermined energy measured by the impressed number of volt-seconds of input battery voltage. When the selected number is reached an output signal is generated by the magnetic amplifier to terminate the AC pulse during an intermediate portion of the cycle. The frequency of switching is fixed by a source driving the converter. Immediate correction against input voltage variation is produced because the specific moment during the AC cycle when termination occurs is made to be directly dependent on the input DC voltage magnitude existing during the monitoring time. Since the DC output voltage from the converter is substantially a time-average of the rectified AC pulses, the DC output magnitude is determined by the AC pulse area. Furthermore, provision is made to seectively adjust the area of the AC pulses over a wide range by providing circuitry which sets the energy absorption capacity. This is accomplished by adjusting the point of saturation of the magnetic amplifier core to control the time when the correcting signal is generated. Some automatic adjustment is also provided by means of error-detecting circuitry which monitors and compensates for variations that might occur in the load.

These and other objects and features of the invention will be better understood upon consideration of the following detailed description when taken in connection with the accompanying drawings in which.

Figures 1, 2:
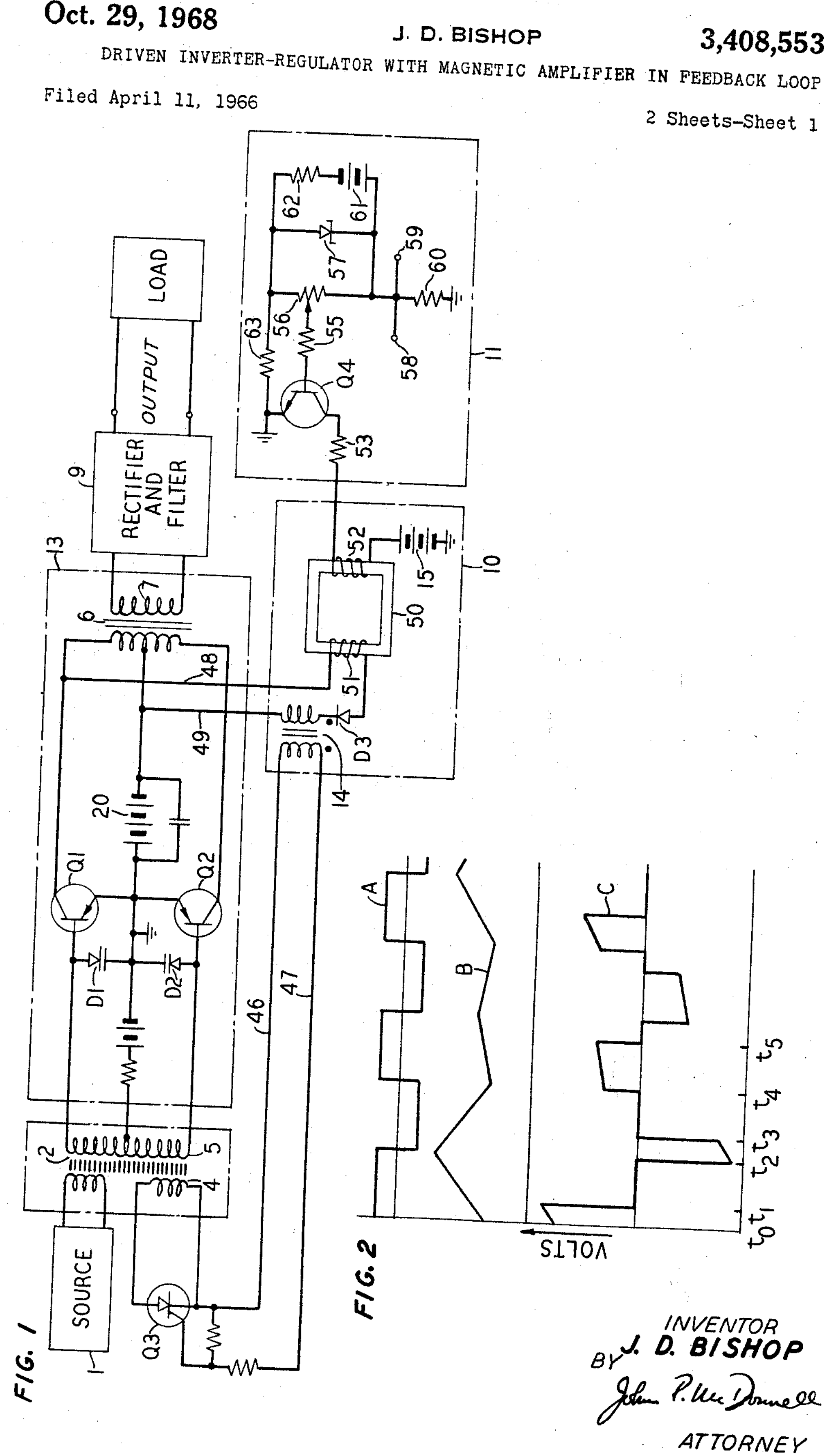
FIG. 1 is a circuit representation of one embodiment of the invention.
FIG. 2 is a graphical representation of idealized waveforms presented for illustrative purposes.

The circuit of FIG. 1 includes a driven DC to DC converter circuit of adjustable duty cycle as described in my U.S. Patent 3,361,952 connected with a feedback circuit 10 having a saturable magnetic amplifier in an arrangement which acts to regulate the converter DC output voltage against changes occurring in the input battery voltage 20. The feedback circuit 10 consists of a saturable magnetic core 50 having both a control winding 52 connected to a local monitoring circuit 11 and a gate winding 51. The converter circuit includes a source 1 driving an inverter 13, the output from which is connected to rectifier and filter 9. This circuit is used to convert input DC voltage 20 to an AC voltage in transformer 6. This AC voltage is then rectified and filtered to produce the DC output voltage magnitude desired. A portion of the AC voltage produced by the inverter is connected to the gate winding 51 through the series circuit which includes diode D3 and the primary of transformer 14. Control winding 52 receives a bias current from the collector circuit of transistor Q4 in the bias adjusting circuit 11. The nominal value of this bias current is determined by the selected setting of the slider of potentiometer 56 while automatic adjustments thereafter take place by virtue of any changes in signal applied to terminals 58 and 59. The series circuit which includes battery 61, resistor 62 and avalanche diode 57 provides a constant potential supply to potentiometer 56 connected across avalanche diode 57. Therefore any adjustment of the potentiometer slider effects a corresponding change in base voltage supplied through base current limiting resistor 55 and resistor 63. Since the emitter is at reference ground potential any change in the position of the slider of potentiometer 56 manifests itself in a corresponding base-emitter junction voltage change to effect a corresponding change in collector current and bias current in control winding 52. Signals which are proportional to the DC load current and voltage can be applied to terminals 58 and 59, respectively, to provide automatic compensatory bias current changes in control winding 52 with changes in load.

The operation of the circuit of FIG. 1 can be explained with greater detail if reference is had to the idealized waveforms shown in FIG. 2. It is to be assumed that source 1 provides a square wave signal such as that shown in curve A of FIG. 2 and that the voltage of input source 20 varies arbitrarily in the illustrated manner shown in curve B of FIG. 2. The waveform of curve A can represent a current in accordance with the dictates of better design procedures and accordingly diodes D1 and D2 would be included as disclosed in my U.S. Patent 3,361,952 referred to above.

The inverter circuit 13 consists of a pair of transistor switches Q1 and Q2 driven from source 1 so that each alternately delivers output current from the input battery source 20 to the center-tapped output transformer 6 to produce an AC voltage therein having the same frequency as the driving source 1. From the moment that transistor Q1 is driven into conduction substantially all of the voltage of input source 20 is connected across the upper half of the primary winding of transformer 6 and across conductors 48 and 49. At this time, core 50 is unsaturated and gate winding 51 presents a very high impedance as compared with that of forward biased diode D3 and the primary of transformer 14, all of which are connected between terminals 48 and 49. Consequently, substantially all of the voltage between conductors 48 and 49 is dropped across winding 51 so that the flux in core 50 increases until a sufficient number of volt-seconds have been absorbed to saturate the core at a time corresponding to $t_1$ shown in curve C of FIG. 2. The moment the core saturates the impedance of winding 51 drops to a very low value so that substantially all of the voltage of input source 20 appears across the primary of transformer 14 to be coupled via conductors 46 and 47 to the gate and cathode electrodes of switch Q3. This switch may be a controlled rectifier or gate diode of the PNPN type. The polarity of this voltage pulse is such as to effect a switching of element Q3 and therefore to change the impedance across winding 4 of transformer 2 from a very high value to a very low value. The resulting effect is a reduction of the voltage across winding 5 to zero and a diversion of the current supplied by driving source 1 from the base circuit of transistor Q1 to the low impedance circuit presented between the anode and cathode of switch Q3. Transistor Q1 is therefore turned off and the output voltage in the secondary winding 7 of transformer 6 as shown in curve C of FIG. 2 is reduced to zero. It is important to note that the magnitude of bias current flowing in winding 52 determines how much flux (as measured by the product of voltage impressed on winding 51 and the time the voltage is sustained) can be absorbed before saturation of core 50 occurs. Since the flux change in core 50 is proportional to the product of the voltage impressed on winding 51 and the time for which it is impressed, the time at which the AC waveform shown in curve C of FIG. 2 drops to zero ($t_1$) is determined both by the value of bias current flowing in winding 52 and by the instantaneous magnitude of the voltage from input battery source 20 impressed across winding 51. Therefore, the area under this generated AC pulse (corresponding to the product of voltage and time) is determined by the valve of bias current flowing in the control winding 52. For a given value of current in control winding 52 the duration of the pulse is determined by the magnitude of the instantaneous voltage of input DC source 20.

The AC inverter output voltage remains zero from time $t_1$ until time $t_2$ when source 1 reverses in polarity and causes the current in winding 4 of transformer 2 to reverse and turn off PNPN switch Q3. Transformer 2 is selected to be a half wave shunt connected magnetic amplifier. Since the positive and negative flux excursions in the core of transformer 2 must be equal, the flux absorbed during the positive half cycle of current from source 1 sets the amount of flux which can be absorbed during the negative half cycle. Therefore the voltage waveform shown in curve C of FIG. 2 will be symmetrical with the interval between times $t_3$ and $t_2$ being equal to the interval between times $t_1$ and $t_0$. During the time between $t_2$ and $t_4$ diode D3 is back biased to prevent any current from flowing in gate winding 51. Therefore, from the moment that the inverter AC output pulse decreases to zero at time $t_1$ until the beginning of the next full cycle from source 1, the current in control winding 52 acts to reset the core in preparation for the next cycle.

If, as shown in curve B of FIG. 2, the peak value of input voltage from DC source 20 has decreased over the next full cycle of source 1, then the ensuing inverter output pulses will have a greater duration as shown in curve C of FIG. 2. For the smaller voltage magnitude it will take a longer time for core 50 to saturate as manifested by the greater interval between times $t_5$ and $t_4$ compared with the interval between times $t_1$ and $t_0$. Assuming no change in bias current flowing in winding 52, the flux absorption capacity of core 50 remains the same so that the integrated area under the curve between times $t_5$ and $t_4$ remains the same and equal to the integrated area under the curve between times $t_1$ and $t_0$.

As explained in the noted copending application filed May 7, 1964 having Ser. No. 365,726, the rectification and filtering of AC inverter output pulses of constant area produces an inverter DC output voltage of constant magnitude. This magnitude of DC output voltage may of course be varied in accordance with the teachings of my present invention by changing the position of the slider of potentiometer 56. For example, if the slider is moved toward terminals 58 and 59, the base-emitter junction voltage will increase to increase the collector current and consequently to increase the bias current in control winding 52. This increase of control winding bias current manifests itself in a larger core flux absorption capacity and consequently larger pulse areas in the inverter output to produce a higher converter DC output voltage. Similarly, in a manner which will be understood by those versed in the art, appropriately phased signals corresponding to the load voltage and current variations applied across the degenerative feedback resistor 60 (at terminals 58 and 59) will produce similar variations in collector current and therefore inverter pulse area to compensate for changes in load. It may also be noted that the quantitative relationship of DC load voltage to DC load current will determine the converter output impedance in a manner familiar to those versed in the art.

In my invention the compensation of DC output voltage against changes in input battery supply voltage is immediate and precise. As has been explained and as shown in FIG. 2, a change of input battery voltage occurring during any inverter cycle (corresponding to a cycle from source 1) produces a corresponding correction in the inverter AC output pulse during the cycle in question. It will also be noted that the required power handling capacity of magnetic amplifier 10 is very small since it need only supply the input trigger pulse to PNPN diode Q3. As a consequence of this the core 50 may be made very small with a resulting saving in weight and cost.

Figure 3:
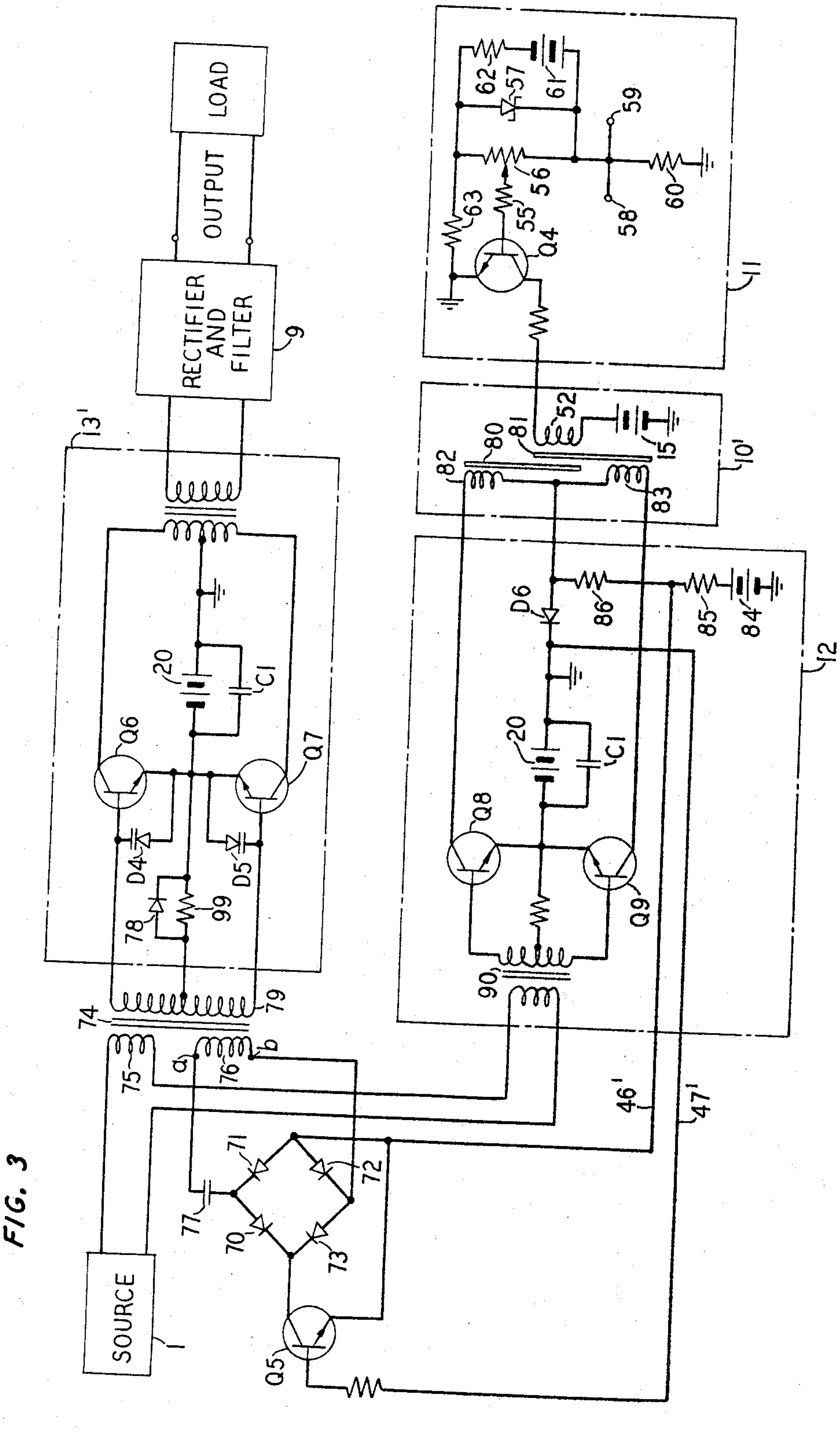
FIG. 3 is a circuit representation of another embodiment of the invention.

The circuit of FIG. 3 is another embodiment of my invention functioning in substantially the same manner in the circuit shown in FIG. 1. Inverter 13', driven from external source 1, converts a DC input voltage 20 to an AC voltage which is rectified and filtered to produce a DC output at the level desired. Similarly, a magnetic amplifier 10' is used in a feedback circuit to monitor the DC input battery voltage 20 over each cycle of the inverter and to provide instantaneous correction for any variations in this voltage. The inverter circuit 13' includes NPN transistors Q6 and Q7 and a self-bias resistor 99 in place of the resistor and battery used in the circuit of FIG. 1. As described previously in connection with the circuit of FIG. 1, source 1 determines the switching frequency of transistors Q6 and Q7 and therefore the frequency of the inverter output waveform obtained from input DC source 20. The major modification over the circuit shown in FIG. 1 is contained in the feedback circuit which includes a separate timing inverter 12, a full wave magnetic amplifier 10' with a control winding 52 supplied from the same bias-adjusting circuit 11 as before. The magnetic amplifier is comprised of a pair of saturable cores 80 and 81 having control winding 52 wound about both and having individual gate windings 82 and 83 wound respectively about each. The output from the magnetic amplifier is connected to transistor Q5 which in turn is connected through a diode bridge which consists of diodes 70, 71, 72 and 73, to winding 76 of a linearly operating transformer 74 (replacing the half wave shunt connected magnetic amplifier used previously). It may be noted that the input DC source 20 and filter capacitor C1 shown in timing inverter 12 are physically the same elements shown in inverter 13'.

The timing inverter 12 is fed from the same external source 1 as the main power inverter 13' and consequently runs in time synchronism therewith. This timing inverter is employed to obtain more precise waveshapes for the gate windings of magnetic amplifier 10'. This timing inverter operates in a standard manner with transistor Q8 and Q9 alternately switching the voltage from input DC source 20 through the respective collector circuits of each. The voltage across the diode D6 (connected in common with each of the collector circuits) supplies the signal for the base-emitter junction of transistor switch Q5 to control its conductivity. The collector circuit of transistor Q8 includes gate winding 82 wound on saturable core 80 of magnetic amplifier 10' while the collector circuit of transistor Q9 includes gate winding 83 wound on saturable core 81 of the magnetic amplifier. The moment after transistor Q8 is rendered conductive by source 1, a small current flows in its collector circuit. This current value is limited by the fact that core 80 is unsaturated and thereby presents a very high impedance in the collector circuit in the form of gate winding 82. Since the current flowing in diode 86 consists of a contribution flowing in a forward direction from battery 84 through resistors 85 and 86 and a contribution flowing in the opposite direction from input DC source 20 through transistor Q8 and gate winding 82, and since prior to the saturation of core 80 the contribution from the former is greater in magnitude than the contribution from the latter, diode D6 will be forward-biased during the time that core 80 is unsaturated. With diode D6 forward-biased, substantially all of the voltage from battery 20 appears across gate winding 82 during the time transistor Q8 is conducting. After this voltage is impressed across winding 82 for a time duration sufficient to cause the flux to increase to the saturation value of core 80, the impedance of winding 82 will decrease to a very low value and the collector current of transistor Q8 will increase to a large enough value to reverse-bias diode D6.

When diode D6 is forward-biased, conductor 46' is positive with respect to 47' since the voltage therebetween is the sum of the voltages across resistor 86 and diode D6. This positive voltage acts to cut off transistor Q5 and therefore to provide a high impedance across winding 76 of transformer 74. However, the moment that diode D6 becomes back-biased, conductor 46' becomes negative with respect to conductor 47' and transistor Q5 becomes forward-biased to present a low collector-emitter impedance and therefore a low AC impedance across winding 76. Assuming, illustratively, that due to the output from source 1 point *a* of winding 76 is positive with respect to point *b*, then an AC short circuit consisting of coupling capacitor 77, diode 70, collector-emitter junction of transistor Q5 and diode 72 is placed across terminals *a* and *b* to effectively short-circuit winding 76 and therefore winding 79. Current from source 1 that had previously been driving one of the transistors in inverter 13' as described above in connection with FIG. 1 is diverted to the short circuit placed across winding 76. A similar short-circuiting path through the diode bridge and transistor Q5 can be traced when point *b* is positive with respect to point *a* during the next half cycle of energy from source 1. Because of the symmetry existing in timing inverter 12 and magnetic amplifier 10', the negative half cycle from source 1 produces a similar type of operation with gate winding 83 and core 81 to produce the same type of output across diode 6 as that described in connection with the previous half cycle of energy from source 1.

As described previously in connection with the circuit of FIG. 1, the bias-adjusting circuitry 11 supplies a bias current to control winding 52 to determine the saturation point of each of the cores enclosed within. The slider of potentiometer 56 provides a nominal adjustment of the converter DC output voltage while the terminals 58 and 59 may, in a fashion similar to that described above, be connected to signals which are proportional to the DC load potential and current to provide automatic compensation against load changes. The bias current flowing in control winding 52 acts to reset each of cores 80 and 81 after they have saturated. It is to be noted that magnetic amplifier 10′ functions to produce a voltage across diode D6 which switches transistor Q5 on and off for each half cycle so that transformer 74 need never saturate. Thus, in the embodiment shown in FIG. 3 a short circuit may be applied to winding 76 during each half cycle of the source frequency by virtue of the switching action of transistor Q5. This may be compared with the circuitry shown in FIG. 1 wherein a short circuit is applied to the corresponding winding 4 through the switching action of PNPN gate diode Q3 and the saturation characteristics of transformer 2. Thus, while the circuit of FIG. 1 provides compensation on a cycle-by-cycle basis to correct the DC converter output voltage against any changes that would normally occur in input battery source 20, the circuit of FIG. 3 provides still more precise compensation on a half-cycle-by-half-cycle basis and is thus effective whenever battery voltage fluctuations occur at speeds in excess of the frequency of source 1. In all other respects the circuits of FIGS. 1 and 3 function in identical manners to produce AC output voltage pulses from inverter 13′ which are of constant and equal area to produce a regulated and adjustable converter DC output supply.

It may also be noted that a protecting diode 78 is connected across biasing resistor 99 to provide a low impedance path for the base current of transistors Q6 and Q7 in the event of an opening in a base or an emitter lead or a short circuit between a base and a collector lead in either transistor. Resistor 99 is short circuited in the case of such an eventuality to prevent a power dissipation therein which would exceed its rating. Furthermore, while a single control winding 52 is shown for the magnetic amplifiers on both FIG. 1 and FIG. 3, additional windings may be included in either case to adjust the bias or operating point in a manner familiar to those versed in the art.

It is therefore to be understood that the abovedescribed arrangements are illustrative of the applications of the principles of the invention. Numerous other arrangements may be devised by those skilled in the art without departing from the spirit and scope of the invention.

What is claimed is:

1. A regulated power supply comprising a D.C. supply voltage varying over a definite range, a load, a driven power inverter circuit connected to said supply voltage and said load to intermittently apply said supply voltage to said load, a source of alternating signals coupled to the input of said power inverter to drive said inverter at the predetermined frequency of said source of alternating signals, switching means coupled to said source of alternating signals and the input of said power inverter to remove the said alternating driving signals from the input of said inverter whenever said switching means is activated, a magnetic amplifier including a saturable core, a source of varying bias coupled to said magnetic amplifier to control the operating level of said magnetic amplifier, monitoring means connected to said supply voltage and said magnetic amplifier to transmit changes in said supply voltage to said magnetic amplifier and to be responsive to the saturation of said magnetic amplifier, and means coupling said monitoring means to said switching means to activate said switching means when said magnetic amplifier saturates and thereby remove the alternating driving signals from said inverter in accordance with supply voltage variations, whereby said load voltage is independent of supply voltage variations.

2. A regulated power supply in accordance with claim 1 wherein said source of varying bias includes means for detecting variations in said load so as to automatically adjust the operating level of said magnetic amplifier in response to load variations and thereby compensate for changes in load.

3. A regulated power supply in accordance with claim 2 wherein said source of varying bias further includes a control winding wound on said saturable core of said magnetic amplifier and a transistor amplifier connected to supply bias to said control winding, said amplifier comprising an adjustable impedance connected across a source of reference potential for biasing said amplifier so as to obtain inverter output pulses independent of said supply voltage variations.

4. A regulated power supply in accordance with claim 2 wherein said monitoring means includes a gate winding wound on said core of said magnetic amplifier, said gate winding being further coupled to said supply voltage through said inverter.

5. A regulated power supply in accordance with claim 4 wherein said monitoring means further includes a diode and a transformer having a primary and secondary winding, said primary winding and diode being connected in series with said gate winding, said secondary winding being coupled to actuate said switching means substantially concurrently with the saturation of said core of said magnetic amplifier.

6. A regulated power supply in accordance with claim 2 wherein said magnetic amplifier includes a second saturable core, said bias varying means is coupled to both of said cores in common, said monitoring means includes a timing inverter and a pair of gate windings, each of said gate windings being individually coupled to a different one of said saturable cores, and wherein said timing inverter is connected to operate synchronously with said power inverter and further connected to alternately couple said supply voltage to each of said gate windings.

7. A regulated power supply in accordance with claim 6 wherein said timing inverter includes a pair of transistors connected in push-pull configuration with a common electrode of each interconnected and with individual output electrodes connected respectively to an individual one of said gate windings, said gate windings being serially connected, a diode serially connected with said supply voltage between said common electrodes and the junction of said gate windings, and wherein there is further included means for forward-biasing said diode while each of said cores is unsaturated and for reverse-biasing said diode upon the saturation of one of said cores.

8. A power inverter in accordance with claim 7 wherein said diode biasing means further includes an external source supplying forward-biasing current for said diode and wherein said diode is connected in the output electrode current path of each of said timing inverter transistors to receive reverse-bias current therefrom.

9. A regulated power supply in accordance with claim 8 wherein said power inverter includes a pair of transistors and a driving source, said switching means includes a diode bridge, a transformer having three windings and a switching transistor having base emitter and collector electrodes, said driving source being coupled by two of said three transformer windings to said core inverter transistors and further coupled to said timing inverter transistors to synchronously render the transistors of each inverter alternatively conductive, said supply voltage being connected simultaneously through a conducting power inverter transistor to said load and through a conducting timing inverter transistor to a connected gate winding, and wherein a third of said three transformer windings is AC coupled to a first pair of opposite vertices of said diode bridge, said emitter-collector electrodes of said switching transistors are coupled to a second pair of opposite vertices of said diode bridge and said base-emitter electrodes of said switching transistor are coupled to said diode to render said switching transistor conductive when said diode is reverse-biased to short said third winding.

10. A regulated power supply in accordance with claim 9 wherein said bias varying means includes a control winding common to both of said cores and means connected to said control winding for selecting a nominal current value therein and for varying said nominal current to compensate for changes in load.

References Cited

UNITED STATES PATENTS

| | | | |
|---|---|---|---|
| 3,101,439 | 8/1963 | Lilienstein et al. | 321—25 XR |
| 3,117,270 | 1/1964 | Tailleur | 321—18 XR |
| 3,196,336 | 7/1965 | Schmidt | 321—18 |
| 3,219,906 | 11/1965 | Keller et al. | 321—1 |
| 3,219,907 | 11/1965 | Josephson | 321—2 XR |
| 3,248,637 | 4/1966 | Albert et al. | 321—18 |
| 3,293,530 | 12/1966 | Baude | 321—18 XR |
| 3,295,043 | 12/1966 | Massey | 321—2 |
| 3,295,053 | 12/1966 | Perrins | 323—22 |
| 3,324,377 | 6/1967 | Mills | 321—16 |
| 3,343,065 | 9/1967 | Gurnett | 321—18 |

LEE T. HIX, *Primary Examiner.*

W. SHOOP, *Assistant Examiner.*